US005472171A

United States Patent [19]

Nishi et al.

[11] Patent Number: 5,472,171

[45] Date of Patent: * Dec. 5, 1995

[54] FREE ROTATION CONTROL APPARATUS FOR A HOIST AND TRACTION MACHINE

[75] Inventors: Yoshio Nishi; Haruo Kubota; Yasuo Wada; Yoshio Ueno; Munenobu Honda, all of Osaka Sayama, Japan

[73] Assignee: Elephant Chain Block Company Limited, Osaka, Japan

[ * ] Notice: The portion of the term of this patent subsequent to Apr. 26, 2011, has been disclaimed.

[21] Appl. No.: 107,153

[22] Filed: Aug. 17, 1993

[30] Foreign Application Priority Data

Aug. 27, 1992 [JP] Japan .................................... 4-228935

[51] Int. Cl.[6] ................................ B66D 1/14; F16D 7/02

[52] U.S. Cl. .......................... 254/352; 254/353; 254/365; 464/46

[58] Field of Search .................................... 254/352, 346, 254/365, 369, 376, 372, 353, 350; 190/8 R, 7 R; 464/45, 46, 47

[56] References Cited

U.S. PATENT DOCUMENTS

| | | | |
|---|---|---|---|
| 3,092,983 | 6/1963 | Huber | 464/46 |
| 4,469,308 | 9/1984 | Nakamura et al. | 254/352 X |
| 4,471,946 | 9/1984 | Meada | 254/350 |
| 4,479,635 | 10/1984 | Meada | 254/376 X |
| 4,483,519 | 11/1984 | Nakamura . | |
| 4,496,136 | 1/1985 | Meada | 464/46 X |
| 4,512,555 | 4/1985 | Nakamura | 254/376 X |
| 4,706,801 | 11/1987 | Vessey | 464/46 X |
| 4,768,754 | 9/1988 | Nishimura | 254/352 X |
| 4,888,539 | 12/1989 | Estabrook et al. | 464/45 X |
| 5,088,694 | 2/1992 | Nishimura . | |
| 5,156,377 | 10/1992 | Nishimura | 254/352 X |
| 5,238,226 | 8/1993 | Nishimura | 254/352 |
| 5,305,989 | 4/1994 | Nishi et al. | 254/352 |
| 5,351,937 | 10/1994 | Nishi et al. | 254/352 |

FOREIGN PATENT DOCUMENTS

| | | |
|---|---|---|
| 0533466 | 3/1993 | European Pat. Off. . |
| 3323150 | 1/1984 | Germany . |
| 549381 | 4/1979 | Japan . |
| 2196929 | 5/1988 | United Kingdom . |

*Primary Examiner*—Daniel P. Stodola
*Assistant Examiner*—Michael R. Mansen
*Attorney, Agent, or Firm*—Stevens, Davis, Miller & Mosher

[57] ABSTRACT

A hoist and traction machine having a mechanical brake (13), wherein a not-relative (14)-rotatable operating handle (18) is axially movably an interposed between a stopper (17) provided at an axial end of a driving shaft (5) and a driving member (8) threadedably engaged with the driving shaft (5). Between the operating handle (18) and the stopper (17) there is provided an elastic biasing member (19) for biasing the operating handle (18) toward the driving member (8) The operating handle (18) is provided with engaging projections (31), the driving member (8) is provided with free rotation control surfaces (35) in elastic contact with the engaging projections (31) respectively, and the free rotation control surfaces (35) are formed in gradient surfaces for applying resistance against movement of the driving member (8) in the return direction with respect to free rotation operation by the operating handle (18) so as to enable the free rotation control state to be held up to a desired value, whereby an input range of a pulling force of a chain during the free rotation control is expanded without reducing operability of free rotation operation.

6 Claims, 8 Drawing Sheets

FREE ROTATION CONTROL APPARATUS FOR A HOIST AND TRACTION MACHINE

FIELD OF THE INVENTION

The present invention relates to a free rotation control apparatus for a hoist and traction machine, and more particularly to a free rotation control apparatus for a hoist and traction machine provided with; a load sheave; a driving shaft having a driven member and for driving the load sheave; a driving member threadedly engaged with the driving shaft; a braking pawl, a braking ratchet wheel engageable with the braking pawl, and braking plates, which are interposed between the driving member and the driven member and constitute a mechanical brake; and driving means, such as a manual lever, for driving the driving member in a first or "normal" direction of rotation or driving said member in a second or "reverse" direction of rotation.

BACKGROUND OF THE INVENTION

Conventionally, this kind of free rotation control apparatus for a hoist and traction machine is well-known which is disclosed in, for example, the Japanese Patent Publication Gazette No. Sho 54-9381. The hoist and traction machine disclosed in this Gazette, as shown in FIG. 16, is so constructed that onto a driving shaft B in association with a load sheave through a reduction gear mechanism is mounted a driven member C made not-relative-rotatable, a driving member D provided at the outer periphery with a toothed portion is threadedably engaged with the driving shaft B, between the driven member C and the driving member D are interposed a braking ratchet wheel F engageable with a braking pawl E and the braking plates G so as to constitute a mechanical brake, and the driving member D is provided with a lever H for normally or reversely driving the driving member D. The lever H is operated to normally or reversely rotate the driving member D through a change-over pawl I selectively engageable with one of the teeth N, so that the mechanical brake constituted of the braking ratchet wheel F, braking plates G, driving member D and driven member C is operated to enable a chain J engaging with the load sheave A to hoist, lower or haul a load.

The hoist and traction machine constructed as the above-mentioned is provided with a free rotation control apparatus which can quickly pull out the chain J toward the load in the no load state without operating the mechanical brake so as to elongate the chain J at the load side ,or pull the same at the no load side so as to be quickly reduced in length at the load side.

The free rotation control apparatus is provided between the driven member C and the driving member D with an elastic resistance member K for applying resistance against the movement of driving member D toward the driven member C, and a free rotation operating handle-L is fixed to the driving member D, so that, when the load sheave A is rotatably driven, a small gap Q is adapted to be formed between the free rotation operating handle L fixed to the driving member D and a stopper M fixed to an axial end of the driving shaft B. In the case of being operated for free rotation, the change-over pawl I is set to the neutral position, the operating handle L is rotatably operated, and the driving member D is screwed backwardly with respect to the braking plate G, whereby the load sheave A can freely be rotated, at which time the driving member D is suppressed of movement thereof toward the driving member C, thereby enabling the load sheave A to be held in the free rotation state without operating the mechanical brake.

Such conventional free rotation control apparatus applies resistance only by the elastic resistance member K against the movement of driving member D toward the driven member, so that, when the chain J is pulled by an excessively strong pulling force and at fast speed for pulling, the driving member D overcomes the resistance of the resistance member K to move toward the driven member C so that the mechanical brake operates not to freely operate the load sheave A, thereby creating the problem in that an input range for the pulling force of chain J during the free rotation control is restricted. Accordingly, while adjusting the pulling speed of chain J, that is, a force to pull the same, the chain J should be pulled not to operate the mechanical brake, thereby creating a problem in that it needs skill to freely rotate the load sheave A.

Regarding this problem, it has been contemplated to enlarge a spring force of the elastic resistance member K, which is interposed between the driven member C and the driving member D, and operates to suppress the movement of driving member D toward the driven member C, whereby, when the spring force is enlarged, another problem is created in that the mechanical brake is poor in its braking effect. Hence, the spring force of elastic resistance member K cannot be enlarged, resulting in that the above-mentioned problems are not solved.

The applicant of the present invention, in order to solve the above-mentioned problem, has proposed a free rotation control apparatus in which a stopper is provided at the axial end of the driving shaft, between the stopper and the driving member is provided an operating handle not-relative-rotatable with respect to the driving shaft, between the operating handle and the stopper is interposed a spring for biasing the operating handle toward the driving member, the operating handle is provided with projections facing the driving member, and at the rear surface of the driving member are provided regulation unit for regulating a relative rotation range of the driving member with respect to the driving shaft and for enabling the regulation to be released by the movement of operating handle in the direction of moving away from the driving member, and free rotation control surfaces which, when the operating handle is rotated to the regulation release position, bring the projections in elastic contact with the free rotation control surfaces by the biasing force of the spring, and apply resistance against the relative rotation of driving member with respect to the driving shaft so as to hold the free rotation state (Japanese Patent Application No. Hei 3-241372).

The free rotation control apparatus applies resistance against relative rotation of the driving member with respect to the driving shaft by the elastic contact of projections with the free rotation control surfaces through the spring and can hold the free rotation control of releasing the operation of mechanical brake, whereby such construction can obtain an effect such that the input range of the pulling force of chain during the free rotation control can be expanded, the free rotation operation can be performed without skill, and, when the chain is loaded, the operating handle automatically returns to operate the mechanical brake.

However, since the free rotation by the operating handle is performed against the aforesaid spring, when the force thereof is strengthened, the operating handle becomes heavy in operation against the spring with the result that the free rotation is poor in operability, whereby the biasing force must be set in consideration of the operability of operating handle.

Accordingly, in the above-mentioned construction, the input range of chain during the free rotation control can be expanded in comparison with the conventional example shown in FIG. 16, but the biasing force of spring cannot fully be enlarged in consideration of its operability, whereby the load is restricted when the handle automatically returns from the free rotation control state to the steady state where the mechanical brake operates, so that the input range of pulling force of chain during the free rotation control, even if expandable, is limited.

SUMMARY OF THE INVENTION

An object of the present invention is to provide a free rotation control apparatus which can expand an input range of a chain pulling force during the free rotation control, up to a desired value without hindering operability of the operating handle and improve operability of pulling the chain during the free rotation control.

In order to attain the above-mentioned object, in a hoist and traction machine which is provided with a load sheave; a driving shaft provided with a driven member and for driving the load sheave; a driving member screwable with the driving shaft; a braking pawl, a braking ratchet wheel engageable therewith, and braking plates, which are interposed between the driving member and the driven member and constitute a mechanical brake; and driving means for normally or reversely driving the driving member, the present invention provides a free rotation control apparatus for making the mechanical brake not-operable and enabling the load sheave to freely rotate, the free rotation control apparatus comprising:

a) a stopper provided at an axial end of the driving shaft, b) an operating handle which is interposed between the stopper and the driving member in relation of being axially movable from a first position in proximity to the driving member to a second position apart therefrom and which is not-relative-rotatable with respect to the driving shaft, c) an elastic biasing member interposed between the stopper and the operating handle and for biasing the operating handle toward the first position in proximity to the driving member;

d) regulation means provided between the operating handle and the driving member and for regulating a relative rotation range of the driving member with respect to the driving shaft when the operating handle is put in the first position and for enabling the regulation to be released when the same is put in the second position; and e) free rotation holding means having resistance means which has free rotation control surfaces which, when the operating handle is put in the second position to release regulation and the same rotates to operate the free rotation, applies to the driving member a biasing force by the elastically biasing member so as to hold the free rotation operation by the operating handle,the free rotation control surfaces applying resistance against movement of the operating handle in the return direction with respect to the free rotation operation thereof.

The driving member may be constituted of one member threadedably engaged with the driving shaft, which otherwise may be constituted of a first driving member having a boss threadedably engage with the driving shaft and a larger diameter portion opposite to the braking plate at the mechanical brake, a second driving member supported relative-rotatably to the boss of the first driving member, an elastic member for biasing a friction plate and the second driving member toward the larger diameter portion of the first driving member, and an adjusting member which changes a biasing force to the friction plate caused by the elastic member so as to adjust a slip load, so that the adjusting member opposite to the operating handle is provided with a regulation unit for regulating a relative rotation range of the driving member with respect to the driving shaft at the first position of the operating handle and a free rotation control surface which is provided with resistance means for applying resistance against the movement of operating handle in the return direction with respect to the free rotation of the operating handle.

In the above-mentioned construction, when the load sheave is free-rotation-controlled, the operating handle is moved to the second position where the same moves away from the driving member against the elastically biasing member, the regulation by the regulation means is released , the driving member can rotate in the normal rotation direction (the load hoist or traction direction), and the handle rotates to forcibly rotate the driving shaft, thereby enabling the driving member to move away from the braking plate. Accordingly, at first, the operating handle can rotate to release the braking action by the mechanical brake comprising the braking pawl and braking plates. Furthermore, the free rotation control holding means can apply the biasing force of the elastic biasing member onto the driving member so as to hold the state where the braking action by the mechanical brake, that is, the free rotation state is released. In this case, the load sheave is controlled to free rotation in such a manner that the operating handle is rotated to rotate the driving shaft so that the driving member screws backwardly so as to move the driving member away from the braking plate. Hence, in the state where the chain hangs the load or is in the traction state, the operating handle, even when intended to operate the free rotation, must be rotated overcome the load acting on the driving shaft. Accordingly, when the load is larger, it is impossible to rotate the operating handle and to control it in the free rotation state, so that safety can be improved to that extent. Since the free rotation state is held by the biasing force of the elastic biasing member interposed between the operating handle and the stopper, as the conventional example shown in FIG. 16, the free rotation state can be maintained without affecting the operation of mechanical brake and the input range of the pulling force of chain during the free rotation control can be expanded.

Moreover, at the free rotation control surfaces for holding the free rotation state are provided resistance means against the free rotation operation of operating handle, whereby magnitude of load, when the handle automatically returns from the free rotation control state to the steady state where the mechanical brake operates, can optionally be set so that the input range of pulling force of the chain during the free rotation control can be expanded up to a desired value, thereby enabling the operability of pulling the chain during the free rotation control to be further improved.

Also, the driving member includes, other than that of the integral form, that provided with an adjusting member constituting an overload prevention mechanism . As the above-mentioned, in the case that the adjusting member is provided with the regulation unit and free rotation control surfaces, during steady operation, the first driving member is screwed forwardly and backwardly with respect to the driven member so as to operate the mechanical brake and also the overload prevention mechanism adjustable of the rated load by the adjusting member can be operated.

Accordingly, while the overload prevention mechanism can operate to prevent overload, the operating handle can hold the driving shaft in the free rotation state without requiring skill. Moreover, the adjusting member for adjusting the slip load of overload prevention mechanism is usable in common as a part related with adjusting the rated load of overload prevention mechanism and with holding the driving shaft in the free rotation state, thereby saving the number of parts to that extent.

The free rotation holding means is preferred to comprise the free rotation control surfaces provided at a side of the driving member and projections in elastic contact with the free rotation control surfaces and for applying to the driving member the biasing force by the elastic biasing member, the projections being provided at the operating handle.

Thus, the driving member is easy to regulate rotation thereof and the resistance means is easy to construct.

Also, the resistance means is so constructed that the free rotation control surfaces are gradient, rough, or convex.

The free rotation control surfaces are each made gradient with which the projections come into elastic contact to apply resistance against the rotation of the operating handle in the return direction thereof, so that the magnitude of load ( the chain pulling force), when the handle returns from the free rotation control state to the not-free-rotation state where the mechanical brake operates by means of the slanted angle of the gradient surface and biasing force of the elastic biasing member, can optionally be set by a simple construction. Also, the free rotation control surfaces are formed of rugged surfaces having a large number of irregularities for applying resistance against return rotation of the projection, whereby the magnitude of load when the handle returns can optionally be set by a simple construction.

In the front of the return rotation direction of the projection when the operating handle rotates in the return direction with respect to the free rotation holding portion of the free rotation control surface in elastic contact with the projections to hold the free rotation during the free rotation of the operating handle, a convex for applying resistance to the rotation of projection in the return direction is provided, so that the convex constitutes the resistance means, and a clicking feel is presented when the projection rides over the convex, whereby the free rotation operation can further accurately be performed, and the magnitude of load when the handle returns is optionally set by selecting a form and height of the projection.

These and other objects of the invention will become more apparent in the detailed description and examples which follow.

DETAILED DESCRIPTION OF THE INVENTION

Initially, a first embodiment of the present invention as shown in FIGS. 1 through 9 will be described.

Figure 1:
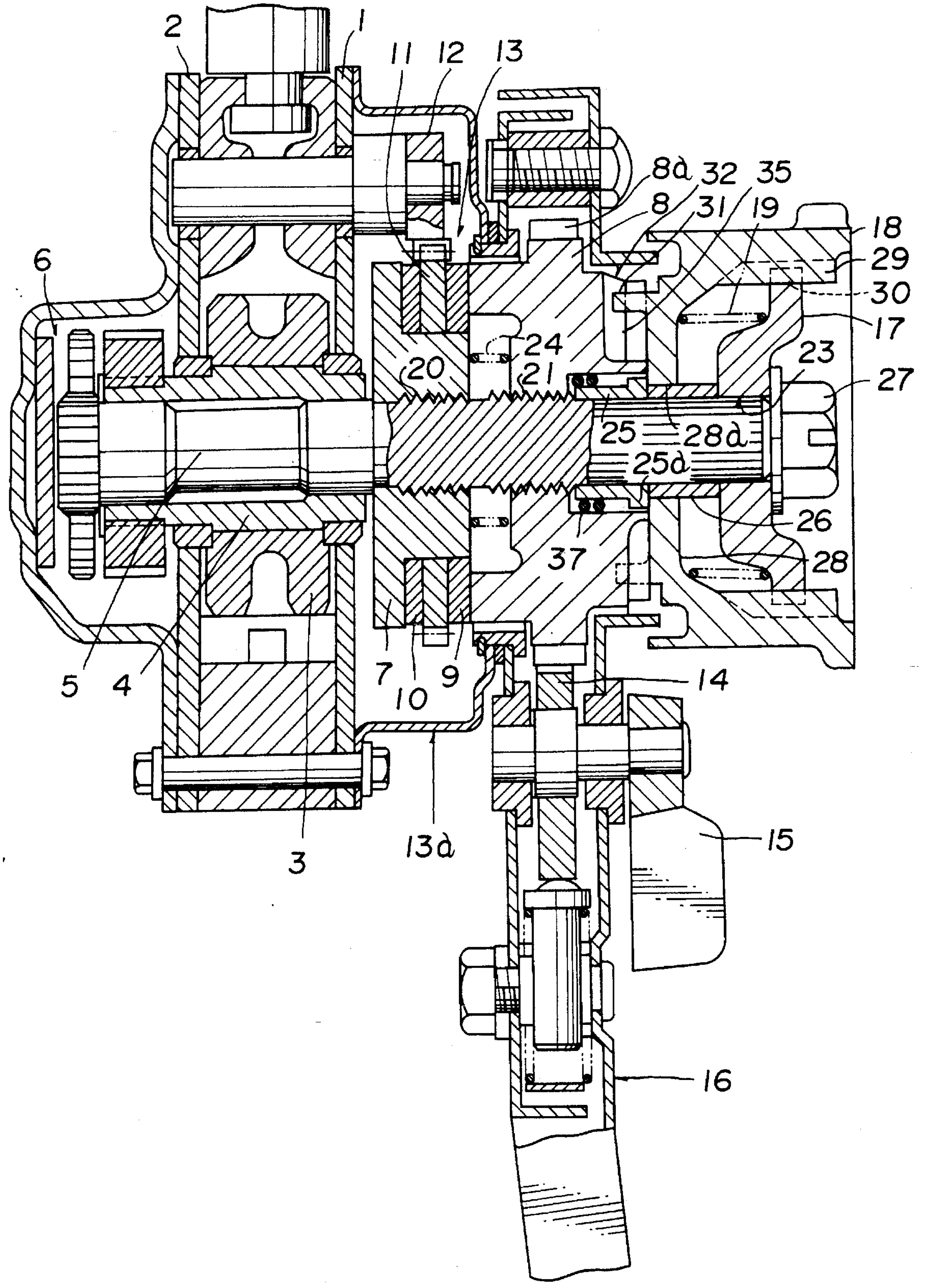
FIG. 1 is a longitudinally sectional view of a first embodiment of a lever type hoist and traction machine which applies thereto a free rotation control apparatus of the present invention.

The first embodiment of the lever type hoist and traction machine of the invention , as shown in FIG. 1, is so constructed that a tubular shaft 4 having a load sheave 3 is rotatably supported between a first side plate 1 and a second side plate 2 which are disposed opposite to each other at a predetermined interval, a tubular shaft 4 is relative-rotatably supported a driving shaft 5 for transmitting a driving torque from an operating lever to be discussed below, between the load sheave 3 and the axial end of the driving shaft 5 projecting from the second side plate is interposed a reduction gear mechanism 6 comprising a plurality of reduction gears, and the driving torque of the driving shaft 5 is adapted to be transmitted at reduced speed toward the load sheave 3.

The axially outer portion of the driving shaft 5 projecting from the first side plate 1 threadedly engages with a driven member 7 comprising a disc hub having a flange, a driving member 8 having at the outer periphery thereof a toothed portion 8*a* is threaded with the driving shaft 5 at the outside of the driven member 7, between the driving member 8 and the driven member 7 are interposed a pair of braking plates 9 and 10 and a braking ratchet wheel 11 respectively, and the first side plate 1 is provided with a braking pawl 12 engageable with the braking ratchet wheel 11, so that the braking ratchet wheel 11 and braking plates 9 and 10 constitute a mechanical brake 13.

Furthermore, at the outside of a brake cover 13*a* for covering the outer periphery of the mechanical brake 13 and at the radially outside of the driving member 8 is provided driving means comprising an operating lever 16 having a pawl 14 provided with a normal and reverse rotation pawl engageable with the toothed portion 8*a* and provided with an operating member 15 for engaging or disengaging the pawl 14 with or from the toothed portion 8*a*.

In the lever type hoist and traction machine constructed as the above-mentioned, at the axial end of the driving shaft 5 is provided a stopper 17, an operating handle 18 not-relative-rotatable with respect to the driving shaft 5 is axially movably interposed between the stopper 17 and the driving member 8 and across a first position where the operating handle 18 moves toward the driving member 8 and a second position where the same moves away therefrom, between the operating handle 18 and the stopper 17 is provided an elastically biasing member 19 mainly comprising a coil spring for biasing the operating handle 18 toward the driving member 8, and between the operating handle 18 and the driving member 8 is provided regulation means for regulating a range of relative rotation of the driving member 8 with respect to the driving shaft 5 and enabling the regulation to be released by movement of the operating handle 18 in the direction of the moving away from the driving member 8.

In detail, in the first embodiment shown in FIG. 1, at the driving shaft 5 are provided first and second screw threads 20 and 21 and serration 23, the driven member 7 is threadedly engaged with the first screw thread 20 and the driving member 8 screws with the second screw thread 21, a coil spring 24 is interposed between the driven member 7 and the driving member 8, so that the coil spring 24 restrains the axial movement of the driven member 7 with respect to the driving member 5, and the driving member 8 is adapted to screw leftwardly in FIG. 1 by normal rotation of the driving member 8 with respect to the driving shaft 5. A pair of sleeves 25 and 26 are fitted onto the serration 23 on the driving shaft 5 at the axial outside of the driving member 8, the first sleeve 25 is provided with a flange 25*a*, the stopper 17 is mounted by serration coupling onto the axial end of the serration 23 outside the second sleeve 26, and a nut 27 is tightened to fix the stopper 17 to the driving shaft 5 through the sleeves 25 and 26.

Figure 2:
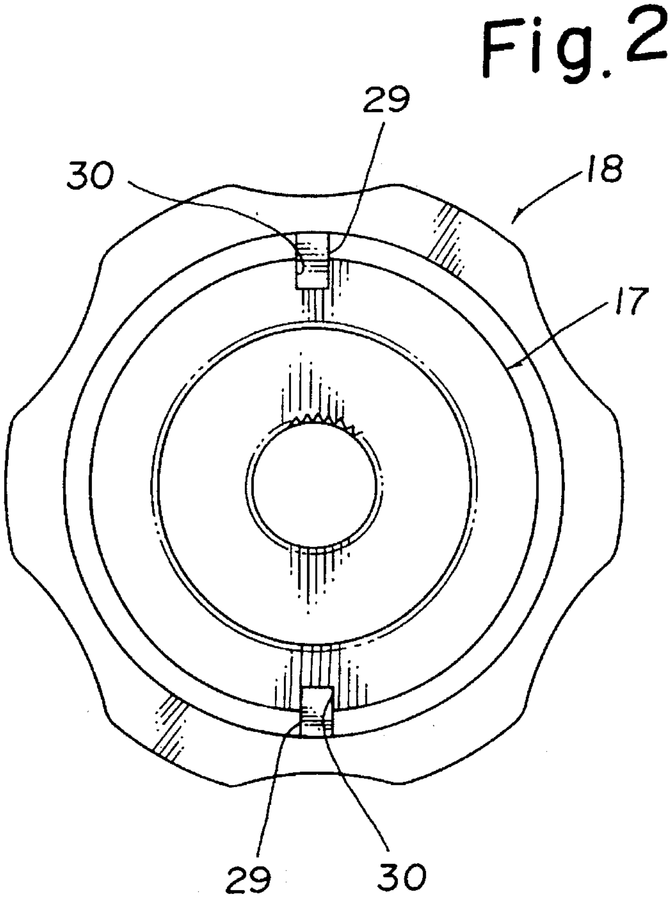
FIG. 2 is a view explanatory of engagement of projections of an operating handle with engaging grooves respectively.

A fitting bore 28*a* provided at a boss 28 of the operating handle 18 is fitted onto the second sleeve 26 so as to interpose the operating handle 18 between the stopper 17 and the driving member 8 in relation of being movable axially of the driving shaft 5 and rotatable, a pair of ridges 29, as shown in FIG. 2, are provided at the inner periphery of the operating handle 18, and the ridges 29, as shown in FIGS. 1 and 2, engage with engaging grooves 30 provided at the outer periphery of the stopper 17 respectively, whereby the operating handle 18 is made not-relative-rotatable with respect to the driving shaft 5.

Between the outside surface of the boss 28 of operating handle 18 and the inside surface of the stopper 17 opposite to the boss 28 is provided an elastically biasing member 19 formed of a coil spring in contact with both the side surfaces, so that the elastically biasing member 19 biases the operating handle 18 to the flange 25*a* of the first sleeve 25, in other words, in the direction of moving the same away from the stopper 17, that is, toward the driving member 8.

Figure 3:
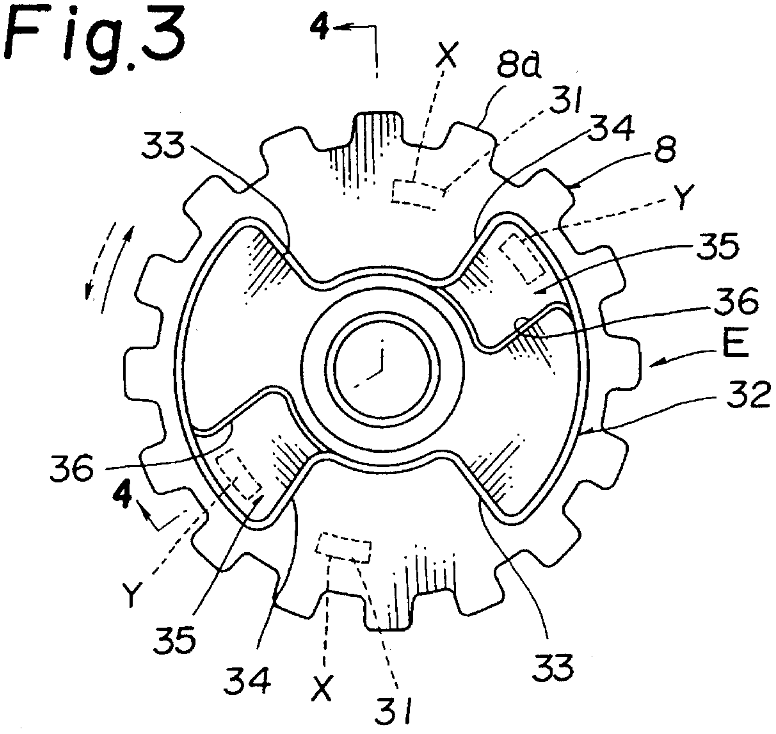
FIG. 3 is a front view of a driving member, showing a relative rotation range thereof with respect to a driving shaft and the rotation positions of engaging projections with respect to the driving member during the free rotation control.
Figure 4:
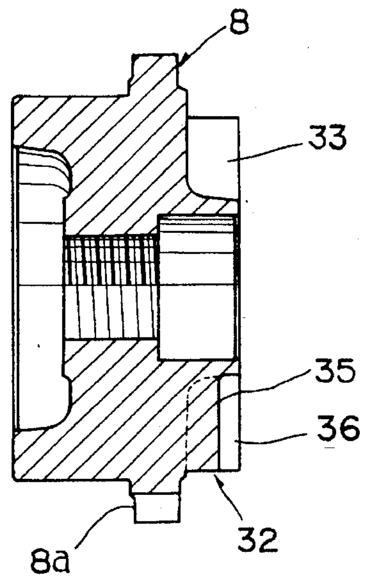
FIG. 4 is a sectional view taken on the line 4—4 in FIG. 3.

At the radial end of the rear surface of the boss 28 of operating handle 18 opposite to the driving member 8, two engaging projections 31 projecting thereto are symmetrically provided as shown in FIG. 3, and at the surface of driving member 8 opposite to the boss 28 of operating handle 18 are symmetrically provided a pair of projections as shown in FIGS. 3 and 4, so that, when the driving member 8 relative-rotates with respect to the driving shaft 5 in the state where the operating handle 18 is positioned in the first position, first and second regulation surfaces 33 and 34 engageable with the engaging projections 31 and for regulating the relative rotation range of the driving member 8 with respect to the driving shaft 5 are provided at the projecting side surfaces of the projections 32 respectively. At the projecting front surfaces of the projections 32 are provided free rotation control surfaces 35 which, when the operating handle 18 is moved away from the driving member 8 so as to relative-rotate with respect thereto, are biased by the elastic biasing member 19 and can contact with the projecting utmost end surfaces of the engaging projections 31 respectively. Furthermore, at the projecting front surfaces of the projections 32 are provided regulating portions 36 which rise from the free rotation control surface 35 and, when the driving member 8 relative-rotates with respect to the driving shaft in the state where the utmost end surfaces of the engaging projections 31 come into contact with the free rotation control surfaces 35, engage with the front sides of the engaging projections 31 in the rotation direction thereof respectively. Also, the lever type hoist and traction machine of the present invention, as shown in FIG. 5, is provided at each free rotation control surface 35 with resistance means for applying resistance against the movement of handle 18 in the return direction with respect to the free rotation operation thereof, that is, against the movement in the direction of the dotted line arrow in FIG. 3.

In brief, the engaging projections 31, free rotation control surfaces 35 and elastic biasing members 19 to bring the engaging projections 31 into elastic contact with the free rotation control surfaces 35, constitute free rotation holding means respectively, and then the aforesaid resistance means is provided on each free rotation control surface 35.

Figure 5:
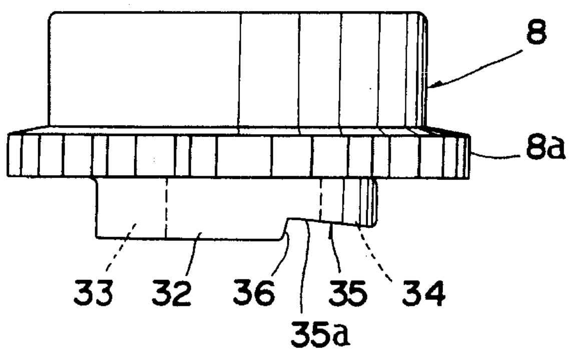
FIG. 5 is a view looking in the direction of the arrow E in FIG. 3.

The resistance means shown in FIG. 5, forms each free rotation control surface 35 into a gradient surface 35*a* axially outwardly gradient from the front side to the rear side in the operation direction of the operating handle 18 operating in the return direction.

In the above-mentioned construction, the first and second screw threads 20 and 21 are threadedly engaged with the driven member 7 and during member 8 respectively are provided on the driving shaft 5 in consideration of workability and strength thereof, in which the first screw thread 20 may be provided with serrations. In a case that the driven member 7 screws with the first screw thread 20, the coil spring 24 is adapted to restrain the driven member 7 from screwing forward, but a snap ring, such as an E-ring , may be provided at the second screw thread 21, or the coil spring 24 may be provided between the snap ring and the driven member 7. Also, the thread groove of the first screw thread 20 may be coated with nylon resin of a large elastic repulsion force and a frictional junction force by, for example, NYLOCK Co. in U.S.A.,so that the driven member 7 may be restrained by anti-return effect from its forward screwing. Furthermore, the driven member 7 may be fixed to the driving shaft 5 by use of a set screw or a cotter pin. Hence, the spring 24 is not necessarily needed.

Next, explanation will be given on the lever type hoist and traction machine constructed as the above-mentioned.

At first, when load hoisting is performed, an operating element 15 provided at the operating lever 16 allows the normal rotation pawl (feed pawl) of the pawl member 14 to engage with the toothed portion 8*a* at the driving member 8 and the lever 16 is operated in swinging motion, thereby rotating the driving member 8 in normal rotation direction (load hoist direction). During the normal rotation , the driving member 8 screws leftwardly in FIG. 1, that is, toward the driven member 7, and the mechanical brake 13 operates so that the driving torque of driving member 8 is transmitted to the load sheave 3 from the driving shaft 5 through the reduction gear mechanism 6 and tubular shaft 4, and the load sheave 3 is rotatably driven in the hoisting direction, so that, following the rotation, a load or the like connected to the chain engaged with the load sheave 3 is hoisted.

When the load is lowered, a reverse rotation pawl (return pawl) of the pawl member 14 at the operating element 15 engages with the toothed portion 8*a* of the driving member 8 and the lever 16 is operated in swinging motion, so that the driving member 8 is rotated in the reverse rotation direction (the load lowering direction). Since the engaging projections 31 are put in the positions X, shown by the dotted line in FIG. 3, between the first regulation surface 33 and the second regulation surface 34, the driving member 8 relatively-rotates with respect to the driving shaft 5 between the first regulation surfaces 33 and the second regulation surfaces 34 and can backwardly screw with respect to the driven member 7, so that the mechanical brake 13 stops its braking action, and the driving shaft 5 can reversely rotate to an extent only of the reverse rotation of the driving member 8, thereby enabling the load lowering work to be carried out in safety.

In addition, during the load hoisting or lowering, the operating handle 18 is normally or reversely rotated without being pulled toward the stopper 17 against the elastic biasing member 19, so that the driving member 8 is moved in the operation or non-operation direction of the mechanical brake. Hence, the load sheave 3 is normally or reversely rotated at a rotation angle corresponding only to the rotation of operating handle 18, thereby enabling the draw-out amount and load hoisting amount of the chain to be fine-adjusted.

Next, explanation will be given on free rotation control of putting the load sheave 3 in the free rotation state to freely extend or reduce the chain in length toward the load.

Figure 9:
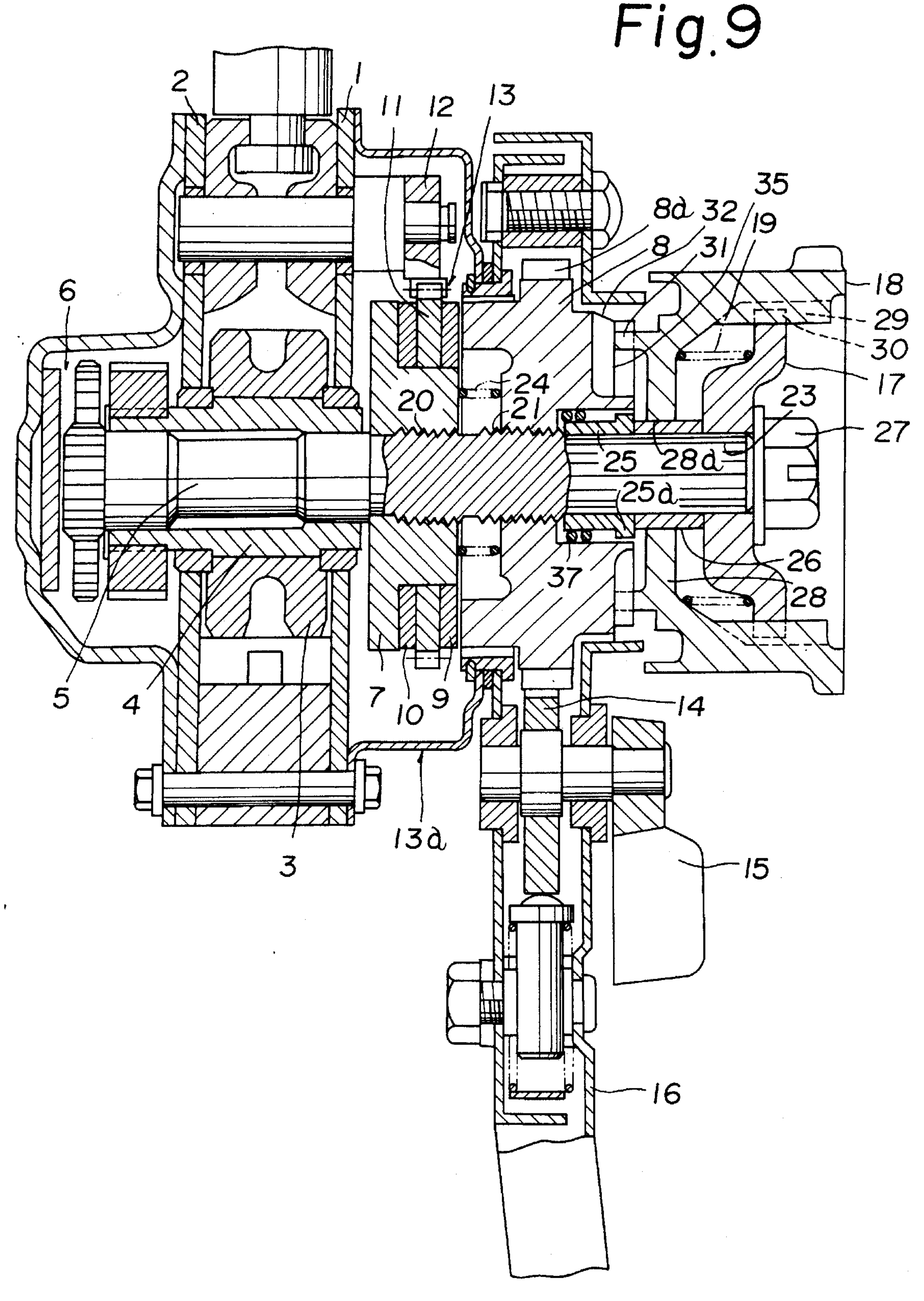
FIG. 9 is a longitudinally sectional view of the state where the operating handle is freely rotatably operated so as to hold the free rotation control, corresponding to FIG. 1.
Figure 10:
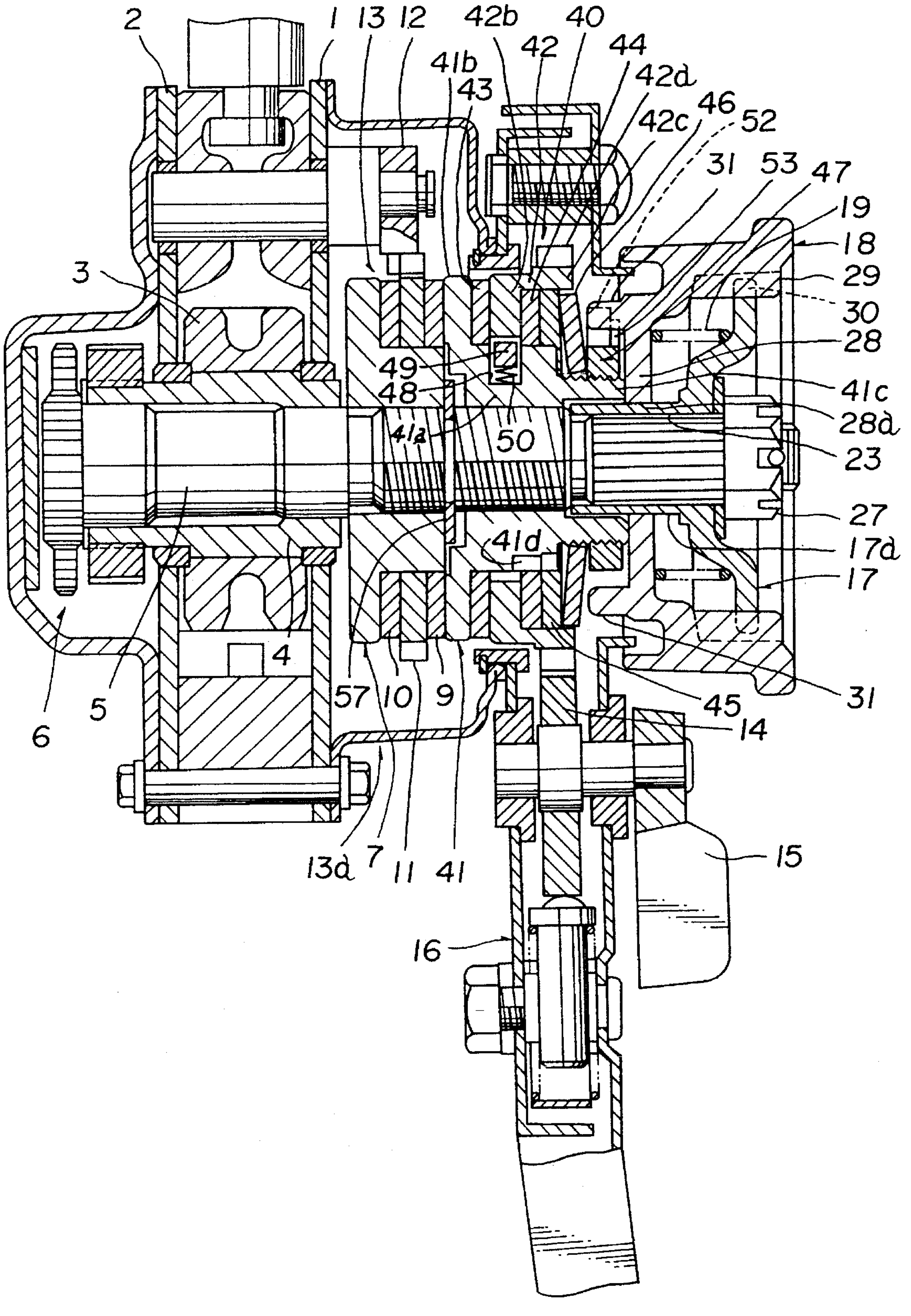
FIG. 10 is a longitudinally sectional view of a second embodiment of the hoist and traction machine incorporating therein the free rotation control apparatus of the invention.

At first, the reverse rotation pawl of the pawl member 14 engages with the toothed portion 8*a* of the driving member 8 so that, when the operating handle 18 is rotated normally (in the hoisting direction) for free rotation control, the driving member 8 is made not-rotatable simultaneously with the operating handle 18. In this state, the operating handle 18 is pulled out toward the stopper 17 against the elastically biasing member 19, in other words, as shown in FIG. 9, the handle 18 is moved from the first position shown in FIG. 1 to the second position apart from the driving member 8, so as to be rotated normally (in the direction of the solid line arrows in FIG. 3). At this time, while the driving member 8 whose toothed portion 8*a* engages with the reverse rotation pawl of the pawl member 14,cannot normally rotate, the driving shaft 5 screwing with the driving member 8 becomes rotatable together with the operating handle 18 through the stopper 17. In other words, the driving shaft 5, by this rotation, is relative-rotated normally with respect to the driving member 8. Hence, the operating handle 18 is rotated over the range regulated by the first and second regulation surfaces 33 and 34, whereby the driving member 8 axially moves away from the driven member 7 in FIG. 1 so that the braking action by the mechanical brake 13 can be released and the load sheave can be put in the free rotation state. In this state, the pawl member 14 is switched to the neutral state so as to enable the chain to be pulled toward the load for quick extension of the chain. Also, the chain can be pulled toward the no load side so as to quickly reduce its length at the load side.

As the above-mentioned, in the state of engaging the driving member 8 with the reverse rotation pawl at the pawl member 14, the operating handle 18 is pulled out to be rotated in the direction of the solid line arrow in FIG. 3, whereby the braking action by the mechanical brake is released to put the load sheave 3 in the free rotation state, at which time the engaging projections 31 provided at the operating handle 18 rotatably move to the positions Y shown by the dotted lines in FIG. 3 respectively. In this state, since the operating handle 18 is biased by the elastically biasing member 19 toward the driving member 8, the projecting utmost end surfaces of engaging projections 31, as shown in FIG. 9, come into elastic contact with the free rotation control surfaces 35, so that frictional resistance caused by the elastic contact can hold the free rotation state of the load sheave 3 operated by the operating handle 18. Moreover, in this instance, the free rotation control surface 35, as shown in FIG. 5, is gradient, whereby, when the engaging projection 31 moves in the return direction from the position where it is in elastic contact with the free rotation control surface 35, the gradient surface applies resistance against the movement of projection 31 in the return direction, thereby enabling the load sheave 3 to further effectively hold the free rotation state due to this resistance.

Accordingly, during the free rotation of holding the free rotation state to pull the chain so as to quickly extend or reduce in length of the chain at the load side, the input range of pulling force of the chain can be widened more than the conventional example, thereby enabling the chain at the load side to be extended or reduced in length without the need of skill. In addition, in the first embodiment, elastic rings 37 are interposed between the outer periphery of the first sleeve 25 and the driving member 8 so that the relative-rotational resistance of the driving member 8 caused by the elastic rings 37 with respect to the first sleeve 25 and biasing the driving member 8 by the coil spring 24, further facilitate holding of the free rotation state of the load sheave 3.

The projections 32 provided at the driving member 8 are provided with the regulating portions 36 respectively, so that, when the driving member 8 relative-rotates with respect to the driving shaft 5 in the state where the projecting utmost end faces of engaging projections 31 come into elastic contact with the free rotation control surfaces 35 of the projections 32, the front in the rotation direction of each engaging projection 31 is regulated for further rotation by the regulating portion 36, so that, when the operating handle 18 is relative-rotated with respect to the driving member 8 in order to freely rotate the load sheave 3, the engaging projection 31 engages at the front thereof in the rotation direction with the regulating portion 36 so as to enable a rotational angle to be limited and an interval between the driving member 8 and the driven member 7 can be restricted not to expand more than the interval required for the free rotation of load sheave 3. Accordingly, during the free rotation operation of relative-rotating the operating handle 18 with respect to the driving member 8, the load sheave 3 can be freely rotated without uselessly rotating the operating handle 18. Also, when the chain is excessively pulled toward the load and the stopper 17 provided at the end of chain at the no-load side engages with the side plates 1 and 2 so that the chain cannot be further pulled so as to suddenly stop the rotation of driving shaft 5, the driving member 8 rotates by its inertia force and screws rightwardly. As the result, it is avoided that the projecting utmost end face of each engaging projection 31 comes into more strongly elastic contact in an encroaching manner with the free rotation control surface 35 so that the free rotation cannot be released.

Furthermore, when the pulling force of chain is strengthened in the state of free rotation control and the load sheave 3 is subjected to a strong force in the reverse rotation direction, elastic contact of the projecting utmost end face of each engaging projection 31 with the free rotation control surface formed of a gradient surface is released and the engaging projection 31 returns between the first regulation surface 33 and the second regulation surface 34, thereby returning to the state where the mechanical brake 13 exerts the braking action. In other words, when the load sheave 3 is subjected to a strong force in the reverse rotation direction at the free rotation state, since the driving member 8 screws with the driving shaft 5 and its rotational inertia force is larger than the driving shaft 5, the free rotation control surface 35 slips with respect to the engaging projection 31 and the driving member 8 starts its rotation slightly later with respect to the rotation of operating handle 18. As the result, the elastic contact of the projecting utmost end face of engaging projection with the free rotation control surface 35 is released, so that each engaging project 31 returns between the first regulation 33 and the second regulation surface 34.

Also, when the chain engaging with the load sheave 3 is loaded and the load sheave 3 is loaded in the reverse rotation direction, even if the operating handle 18 is intended to operate free rotation, since the operating handle 18 normally rotates to operate the free rotation, the operating handle is not operable for the larger load. Even if the handle 18 is operated, the operating handle rotates relatively, due to the load, together with the driving shaft 5 in the reverse rotation direction, whereby the elastic contact of the projecting utmost end face of engaging projection 31 with the free rotation control surface 35 is released and the handle 18 returns to the state where the mechanical brake 13 exerts the braking action. Hence, the load sheave 3 cannot be put in the free rotation state and also safety is improved.

Next, explanation will be given on a second embodiment shown in FIGS. 10 through 15.

The second embodiment assembles an overload prevention mechanism 40 in the first embodiment and is not different in fundamental construction therefrom. Accordingly, regarding the construction in common thereto, explanation is omitted and the common members are designated with the same reference numerals.

In the second embodiment of the invention, the driving member 8 of the first embodiment comprises a boss **41*a* screwable with a driving shaft 5, a first driving member 41 having a larger diameter portion 41*b* opposite to a braking plate 9 at a mechanical brake 13, and a second driving member 42 supported relative-rotatably onto the outer periphery of the boss 41*a* of the first driving member 41, the second driving member 42 being provided at the outer periphery thereof with a toothed portion 42*a* engageable with the pawl member 14 provided at the operating lever 16**.

At the boss **41*a* of the first driving member 41 are disposed a pair of friction plates 43 and 44 axially sandwiching therebetween the second driving member 42, an elastic member 46 mainly comprising a dish spring is disposed outside one friction plate 44 through a holder 45, and outside the elastic member 46, an adjusting member 47 for changing a biasing force of the elastic member 46 applied to the friction plates 43 and 44 so as to adjust a slip load screws with the boss 41a, thereby constituting the overload prevention mechanism 40**.

In detail, the first driving member 41 is provided at one axial end of the boss **41*a* with the larger diameter portion 41*b* having a biasing surface opposite to the braking plate 9, and at the other axial end with a smaller diameter portion 41*c* having at the outer periphery thread grooves, so that the elastic member 46 is freely fitted onto the smaller diameter portion 41*c* and the adjusting member 17 screws therewith. Also, at the outer periphery of the boss 41*a* is provided a locking groove 41*d* for locking the holder 45, and a projection projecting from the inner periphery of holder 45 engages with the groove 41*d*, so that the holder 45 is supported to the boss 41*a*** in relation of being axially movable and not-relative-rotatable.

The second driving member 42 is formed of a cylindrical portion **42*c* having a vertical portion 42*b* and the toothed portion 42*a*, the vertical portion 42*b* is rotatably supported at the inner periphery onto the boss 41*a*, and between the inner periphery of vertical portion 42*b* and the outer periphery of boss 41*a* is provided a unidirectional rotation mechanism which, when the second driving member 42 rotates in the rotatably driving direction, makes the second driving member 42 freely rotatable with respect to the first driving member 41 and which, when the same rotates in the not-rotatably-driving direction, makes the second driving member 42 and first driving member 41** integrally rotatable.

Figure 13:
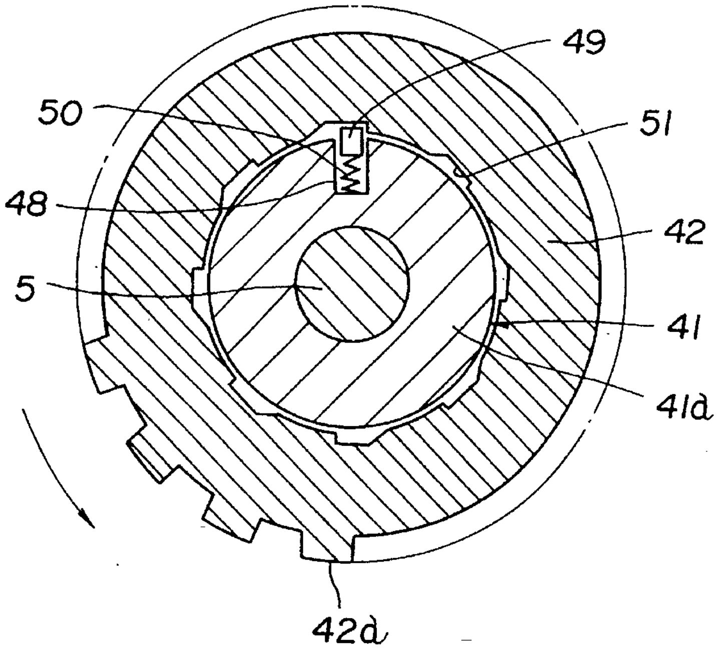
FIG. 13 is a view explanatory of a unidirectional rotation mechanism provided between the first and second driving members.

The unidirectional rotation mechanism, as shown in FIG. 13, is so constructed that a recess 48 is formed at the outer periphery of the boss **41*a* at the first driving member 41, in the recess 48 is held an engaging element 49 to be permanently radially outwardly biased through a spring 50, at the inner periphery of the second driving member 42 are formed a plurality (eight in the drawing) of engaging grooves 51 which extend each circumferentially in a wedge-like manner and into which the engaging element 49 can enter, and, when the second driving member 42 is rotated in the load lowering direction shown by the arrow in FIG. 13, the engaging element 49 engages with one of the engaging grooves 51 at an angle of at least 45° so as to enable the second driving member 42 and first driving member 41 to be integrally rotatable, thereby coping with the case where a larger torque than the transmitting torque of overload prevention mechanism 40** is required during the load lowering.

The second embodiment of the above-mentioned construction builds therein the overload prevention mechanism 40 as the above-mentioned and also the free rotation control apparatus as the same as in the first embodiment, the free rotation control apparatus being the same as that in the first embodiment and omitted of explanation. In addition, the adjusting member 47 of the overload prevention mechanism 40 is opposite to the operating handle 18 at the free rotation control apparatus.

Figure 12:
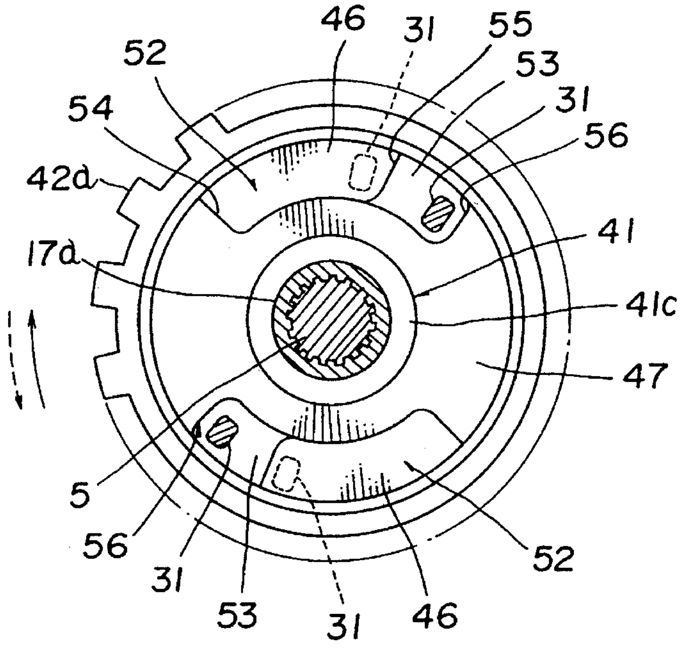
FIG. 12 is a sectional view taken on the line 12—12 in FIG. 11.
Figure 14:
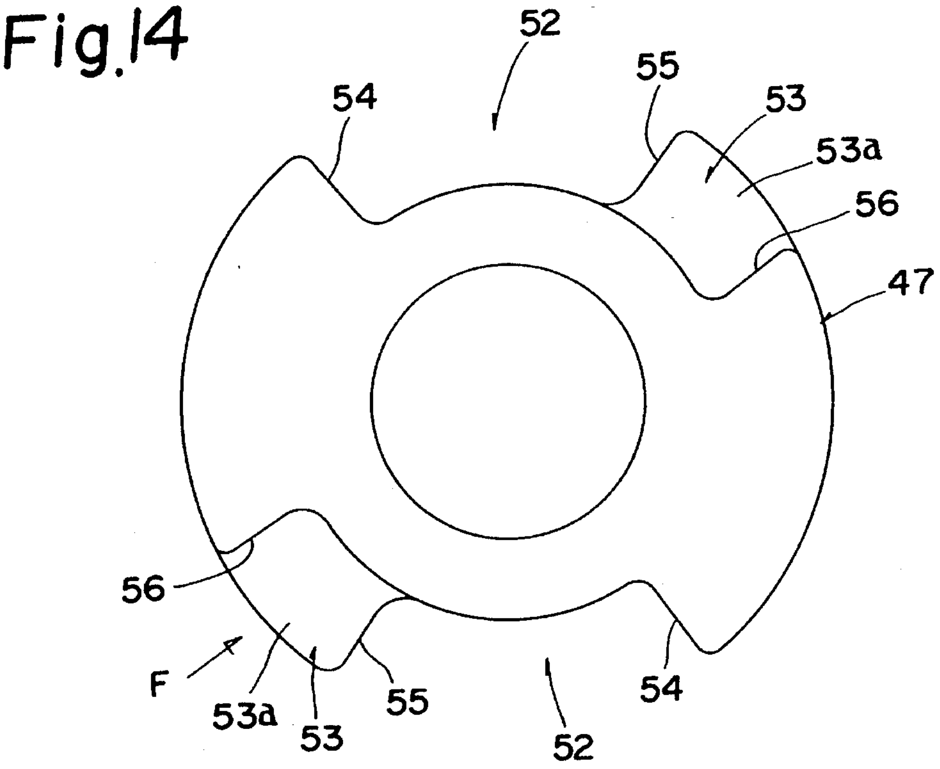
FIG. 14 is a front view of an adjusting member only.

The adjusting member 47 is provided with regulating portions 52 for regulating the relative rotation range of the first driving 41 with respect to the driving shaft 5 in the first position of the operating handle 18, and with free rotation control surfaces 53 which come into elastic contact with the engaging projections 31 provided at the operating handle 18, apply resistance against the rotation of the first driving member 41 with respect to the driving shaft 5, and hold the free rotation operation of the driving shaft 5 by the operating handle 18, so that the adjusting member 47 can perform both adjustment of slip load and holding of free rotation control at the overload prevention mechanism 40. In greater detail regarding the adjusting member 47, the regulation portions 52, as shown in FIGS. 12 and 14, are composed of symmetrical cutouts formed at the outer peripheral portions and regulating surfaces 54 and 55 formed at both circumferential sides of the cutouts. Accordingly, when the operating handle 18 does not operate, that is, in the first position, as the same as the first embodiment, the engaging projections 31 provided at the operating handle 18 enter into the cutouts and engage with the regulating surfaces 54 or 55, so that the relative rotation range of the first driving member 41 with respect to the driving shaft 5 is regulated. Hence, the first driving member 41 can screw forwardly or backwardly with respect to the braking plate 9 within the relative rotation range, and the mechanical brake 13 operates to allow the driving shaft 5 to rotate following the rotations of the first and second driving members 41 and 42, whereby the load hoisting, lowering, traction, or release thereof is possible.

Free rotation control surfaces 53, with which the utmost end faces of the engaging projections 31 come into elastic contact at the second position of the operating handle 18, are symmetrically provided at the surface of the adjusting member 47 opposite to the operating handle 18 and at the front in the normal rotation direction shown by the solid line arrow in FIG. 12 with respect to each regulating portion 52, in other words, at the front in the free rotation operation direction of the operating handle 18. By the elastic contact of each projection 31 with the free rotation control surface 53, the first driving member 41 is given resistance against its rotation through the adjusting member 47 so as to enable the free rotation operation by the operating handle 18 to be held.

Figure 15:
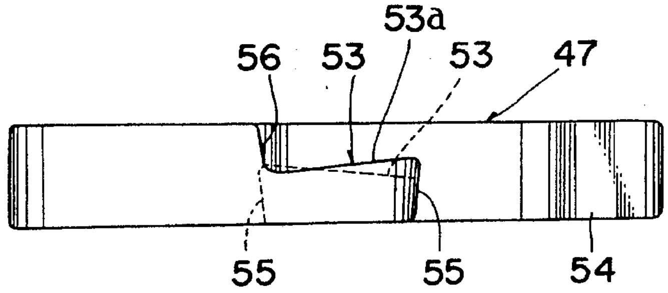
FIG. 15 is a view showing a portion of FIG. 11.
Figure 16:
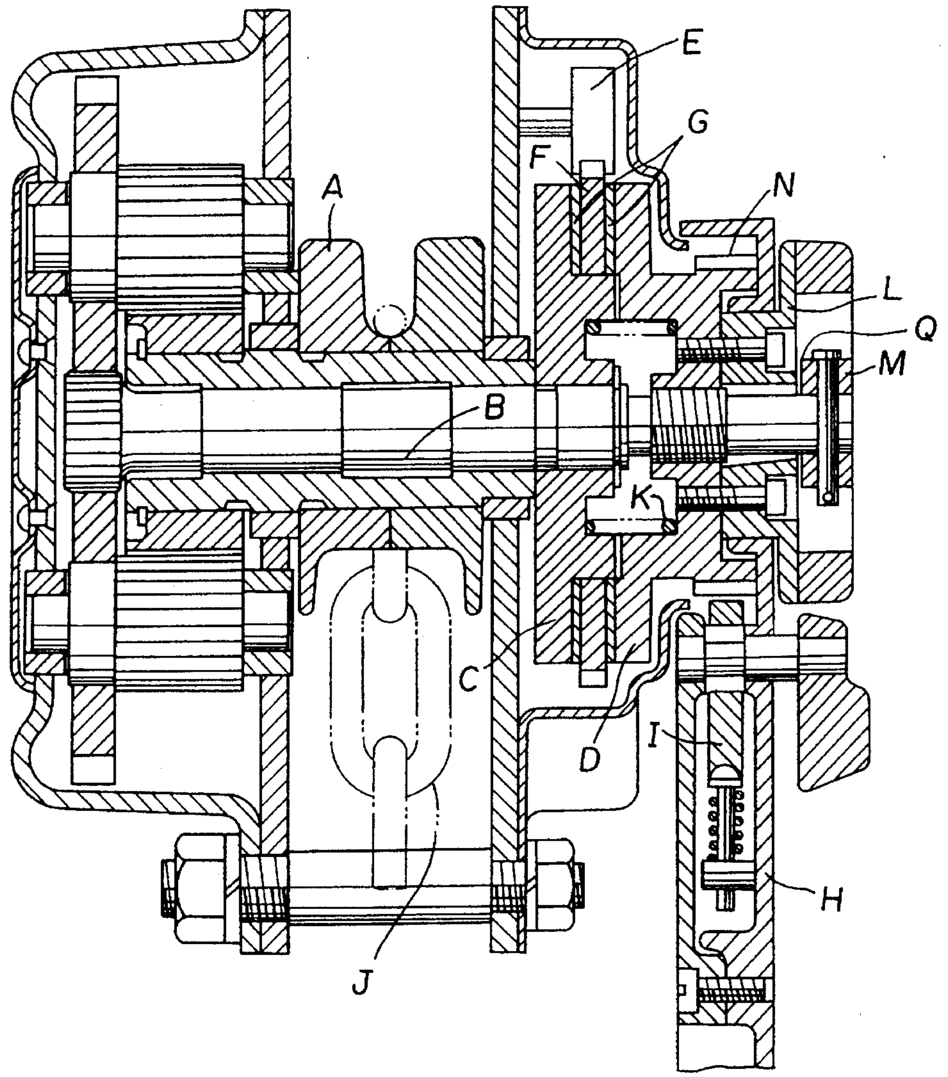
Fig.16 (PRIOR ART)
FIG. 16 is a sectional view of a conventional example of a free rotation control apparatus of a hoist and traction machine.

The free rotation control surfaces 53, as shown in FIGS. 14 and 15, are each provided, as the same as the free rotation control surfaces of the first embodiment, with resistance means comprising a gradient surface 53*a* for apply resistance against movement in the return direction (in the direction the dotted line arrow in FIG. 12) with respect to the free rotation operation of the operating handle 18.

Figure 11:
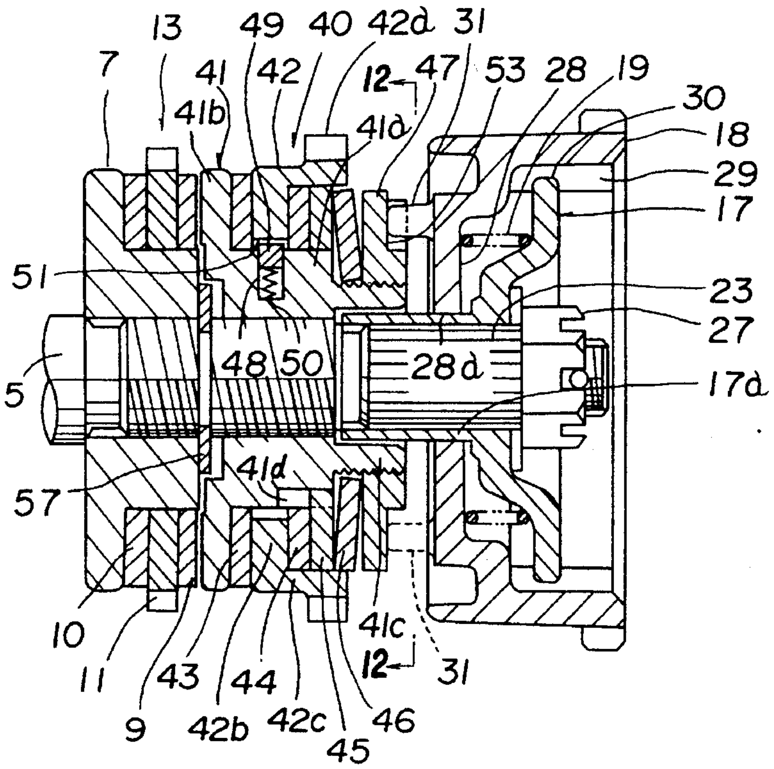
FIG. 11 is a sectional view of a principal portion only, showing the state where the operating handle is freely rotatably operated so as to hold the free rotation control, corresponding to FIG. 7.

In the case where the free rotation is operated in the second embodiment, as with the first embodiment, after the second driving member 42 is fixed through the pawl member 14 of the lever 16, the operating handle 18 is pulled out toward the stopper 17 and rotated relative to the first and second driving members 41 and 42, whereby the driving shaft 5 integrally rotates by the relative rotation and the first driving member 41 screwing therewith screws backwardly from the braking plate 9 so that the driving shaft 5 can be put in the free rotation state. Moreover, at this time, since the utmost end face of each projection 31 is biased by the elastic biasing member 19 to come into elastic contact with the free rotation control surface 53 of the gradient surface 53*a* as shown in FIGS. 11 and 12, the elastic contact and resistance caused by the gradient surface 53*a* can suppress the driving member 41 from rotating with respect to the driving shaft 5, thereby enabling the driving shaft 5 to be held in the free rotation state.

In addition, the second embodiment, as the same as the first embodiment, is provided with free rotation regulation portions 56, as shown in FIG. 12, which prevents the operating handle 18 from being rotated than is needed by the contact of the projection 31 when the handle 18 is rotated with respect to the first and second driving members 41 and 42.

The second embodiment is different from the first embodiment in the following points except for incorporating therein an overload prevention mechanism 40: At first, the stopper 17 has at the central portion thereof a tubular member 17*a* formed integral therewith and serration-coupled with the serration 20 at the driving shaft 5, and the sleeve 25 used in the first embodiment is omitted.

Also, the tubular member 17*a* is not provided with the flange 25*a* provided at the sleeve 25 of the first embodiment. The operating handle 18 is biased by the elastically biasing member 19 so as to come into elastic contact with the end face of the smaller diameter portion 41*c* of the first driving member 41.

Furthermore, the driven member 7 screws with the driving shaft 5 and is restrained by a snap ring 57 from axial movement.

Next, explanation will be given on operation of the second embodiment constructed as the above-mentioned.

At first, in the case where the load is hoisted or lowered, the feed pawl at the pawl member 14 provided at the operating lever 16 engages with the toothed portion 42*a* at the second driving member 42 by operating the operating portion 15 and the lever 16 is operated in swinging motion, so that the second driving member 42 rotates and the first driving member 41 also normally rotates together therewith through the overload prevention mechanism 40. In this case, since the projections 31, as shown in the dotted line in FIG. 12, is positioned between the regulation surfaces 54 and 55, during the normal rotation, the first driving member 41 screws forward toward the braking plate 9 so as to operate the mechanical brake 13. The driving torque of the second driving member 42 is transmitted to the first driving member 41 through the overload prevention mechanism 40 and to the driving shaft 5 through the mechanical brake 13, and from the driving shaft 5 to the load sheave 3 through the reduction gear mechanism 6 and tubular shaft 4, thereby enabling the load to be hoisted or lowered. In such state where the load sheave 3 is subjected to a load larger than the rated load adjusted by the adjusting member 47, the overload prevention mechanism 40 slip-operates and the driving power is not transmitted to the first driving member 41, thereby enabling the hoisting or traction over the rating to be regulated.

In the case where the load hoisting or lowering is carried out, the reverse rotation pawl of the pawl member 14 engages with the toothed portion 42*a* of the second driving member 42 to operate the lever 16 in swinging motion, so that the first driving member 41 rotates integrally with the second driving member 42 through the unidirectional rotation mechanism in the reverse rotation direction. In this case, since the projections 31 also are positioned at the regulating portions 52 respectively, the first driving member 41 rotates relatively with respect to the driving shaft 5 and can screw backwardly with respect to the braking plate 9, so that the driving shaft 5 is rotated at a predetermined angle until the mechanical brake 9 operates, which is repeated to enable load-hoisting or lowering.

In this case, the lever 16 swings to rotate the first and second driving members 41 and 42 in the not-driving rotation direction, that is, in the reverse rotation direction, but, as shown in FIG. 13, since the plurality of engaging grooves 51 engageable with the engaging element 49 are provided at equal intervals of at least 45° on the inner periphery of the second driving member 42, the engaging element 49 engages with one of engaging grooves 51 by rotation at an angle of at least 45° without need of rotating the second driving member 42 in a full rotation, so that the first driving member 41 can be integral with the second driving member 42, thereby enabling load hoisting, lowering, or release of traction to quickly start.

Next, explanation will be given on a case where the driving member is put in the free rotation state to carry out free extension or reduction in length of the chain toward the load.

This operation, as with the first embodiment, allows the reverse rotation pawl of the pawl member 14 to engage with the toothed portion 42*a* at the second driving member 42, so that, when the operating handle 18 normally rotates, the second driving member 42 is rendered not to rotate together with the operating handle 18, and then the operating handle 18 is pulled out toward the stopper 17 against the elastic biasing member 19 so as to be normally rotated. At this time, the second driving member 42, whose toothed portion 42*a* engages with the reverse rotation pawl of the pawl member 14, cannot normally rotate, but the driving shaft 5 together with the operating handle 18 rotates relatively through the stopper 17 over the range regulated by each regulating portion 52 during the normal rotation. The first driving member 41 is moved by the above-mentioned relative rotation in the direction of moving away from the braking plate 9, that is, rightwardly in FIG. 10, whereby the braking action by the mechanical brake 13 can be released to enable the driving shaft 5 to be put in the free rotation state. The projecting utmost end face of each projection 31, as shown in FIGS. 11 and 12, comes into elastic contact with the free rotation control surface 53 at the adjusting member 47, whereby the operating handle 18 can be restrained by the elastic contact from relative-rotating with respect to the first and second driving members 41 and 42, whereby the driving shaft can hold its free rotation state. Accordingly, in this state , the chain is pulled toward the load side to be quickly extendable and toward the no-load side to be quickly reduced in length at the load side.

In addition, during the free rotation of the driving shaft 5, the projections 31 come into elastic contact with the free rotation control surfaces 53 at the adjusting member 47, but the adjusting member 47 rotates by the elastic contact but does not axially move, and the rated load, by which the overload prevention mechanism 40 starts operation, is not changed. In other words, since the adjusting member 47 is subjected to the reaction of elastic member 46, the rotational resistance of adjusting member 47 is larger than that of the operating handle 18, whose each projection 31 is in elastic contact with the free rotation control surface 53, with respect to the first driving member 41 during the relative rotation, whereby the adjusting member 47 never rotates by the torque transmitted thereto through the projection 31. Accordingly, the preadjusted slip load of the overload prevention mechanism 40 is not changed by the adjusting member 47.

Furthermore, in the state where the driving shaft 5 is held in the free rotation state as the above-mentioned, when the chain increases in its pulling force so as to apply a strong force in the reverse rotation direction onto the driving force 5, elastic contact of the utmost end face of each projection 31 with the free rotation control surface 53 is released, whereby the projection 31 returns to the regulating portion 52 and the mechanical brake 13 returns to the operable state.

As the above-mentioned, in the second embodiment, when the operating handle 18 is operated not to freely rotate, the first driving member 41 is screwed forwardly or backwardly with respect to the braking plate 9 so as to enable load-hoisting, load-lowering, load traction, or release of traction, to be performed, at which time the overload prevention mechanism 40 also is operable. Moreover, during the free rotation operation of operating handle 18, the operating handle 18, as the same as the first embodiment, is relative-rotated with respect to the first and second driving members 41 and 42, and each projection 31 at the operating handle 18 is brought into elastic contact with the free rotation control surface 53, thereby enabling the free rotation state of driving shaft 5 to be held.

Accordingly, while the overload prevention mechanism 40 can operate to prevent overload, the free rotation operating handle 18 can hold the driving shaft 5 in the free rotation state without requiring skill. Moreover, the adjusting member 47 is not only used as a part for adjusting the rated load of the overload prevention mechanism 40 but also used in common for holding the driving shaft 5 in the free rotation state, thereby enabling the number of parts to be minimized to that extent.

In addition, in the above-mentioned second embodiment, as shown in FIG. 13, the recess 48 is provided at the outer periphery of the boss 41*a* of the first driving member 41 so as to hold the engaging element 49 and the engaging grooves 51 are provided at the inner periphery of the second driving member 42, in which the engaging element 49 may be held at the second driving member 42 and the plurality of engaging grooves may be provided at the outer periphery of the boss 41*a*.

Figure 6:
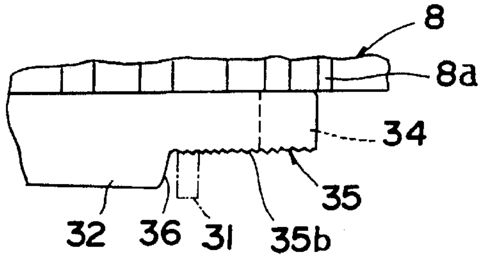
FIG. 6 is a partial view of a modified embodiment of resistance means.
Figure 7:
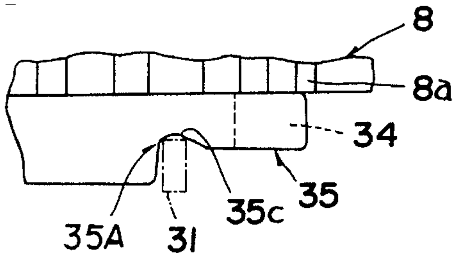
FIG. 7 is a partial view of another modified embodiment of the resistance means.

Also, in the first and second embodiments as the above-mentioned, the free rotation control surfaces 35 and 53 are formed of the gradient surfaces 35*a* and 53*a* as the resistance means for applying resistance against the rotation in the return direction of the operating handle 18. Besides this, as shown in FIG. 6, the free rotation control surface 35 may be made flat and formed of a largely rugged surface 35*b*. Also, as shown in FIG. 7, a recess 35*c* may be provided at a free rotation holding portion 35A at the free rotation holding surface 35 with which the projection 31 comes into elastic contact to hold the free rotation operation when the operating handle 18 is operated for free rotation, so that the front of the recess 35*c* in the return rotation direction of the projection 31 may be formed gradient.

Figure 8:
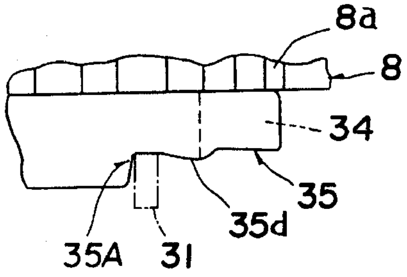
FIG. 8 is a partial view of a still another modified embodiment of the resistance means.

Furthermore, as shown in FIG. 8, a projection 35*d* for applying resistance against return rotation of the projection 31 may be provided at the front of the free rotation control surface 35 in the return rotation direction of the projection 31 with respect to the free rotation holding portion 35A, so that, when projection 31 rides over the projection 35*d*, resistance may be applied against rotation thereof.

In this case, when the operating handle 18 rotates to operate free rotation, the projection 31 rides over the projection 35*d* to be positioned at the free rotation holding portion 35A, whereby the operation of the handle 18 can be given a clicking feeling and its free rotation operation can effectively and accurately be carried out.

Also, the first and second embodiments of the invention are both applied onto the lever type hoist and traction machine, but may be applied to a manual hoist machine having a hand wheel.

As seen from the above, the hoist and traction machine of the invention can release the braking action by the mechanical brake to perform the free rotation control by the free rotation operation of the operating handle 18 to move the operating handle 18 from the driving member 8 against the elastic biasing member 19 and to normally rotate the same, and can hold the free rotation control state where the braking action by the mechanical brake is released by being biased by the elastic biasing member 19. Moreover, at the free rotation control surface for holding the free rotation control state is provided the resistance means for applying resistance against the movement of operating handle 18 in the return direction with respect to the free rotation operation thereof, whereby the biasing force of elastic biasing member 19 never increases and a value of releasing the free rotation control state, in other words, a value of load, when the chain is subjected to the load so as to return to the steady state where the mechanical brake operates can desirably be set. Accordingly, there is no need for increasing the biasing force of the elastically biasing member 19, whereby the operability when the operating handle 18 is operated for free rotation is not reduced but improved to effectively hold the free rotation control state. Also, during the free rotation control, the input range of pulling force of the chain is expanded so that the free rotation control is ensured and the chain can simply be extended or reduced in length without requiring skill.

Also, when the load acts on the chain engaging with the load sheave 3, even if operated for free rotation, the free rotation state of the load sheave 3 cannot be held, thereby raising safety. As shown in the second embodiment, the hoist and traction machine built-in with the overload prevention mechanism 40 can prevent overload by operating the mechanism 40 and also the driving shaft 5 can be held in the free rotation state without requiring skill. Moreover, the adjusting member 47 is not only used as the part for adjusting the rated load of the overload prevention mechanism 40, but also used in common as the part for holding the driving shaft 5 in the free rotation state, thereby enabling the number of parts to be saved to that extent.

Although several embodiment have been described, they are merely exemplary of the invention and not to be constructed as limiting, the invention being defined solely by the appended claims.

What is claimed is:

1. In a hoist and traction machine provided with a load sheave; a driving shaft provided with a driven member and for driving said load sheave; a driving member threadedly engageable with said driving shaft; a braking pawl and a braking ratchet wheel engageable with said braking pawl and braking plates, interposed between said driving member and said driven member and constituting a mechanical brake; and driving means for driving said driving member rotatably in a first direction or in a reverse direction of rotation; a free rotation control apparatus which allows said mechanical brake to be not-operable and said load sheave to be freely rotatable, provided with a) a stopper at an axial end of said driving shaft, b) an operating handle for free rotation operation, which is interposed between said stopper and said driving member so as to be axially movable across a first position where said operating handle moves toward said driving member and a second position where said operating handle moves away therefrom and being not relatively rotatable with respect to said driving shaft, c) an elastic biasing member interposed between said stopper and said operating handle and for biasing said operating handle toward the first position where said operating handle moves toward said driving member, d) regulation means which is provided between said operating handle and said driving member acting to regulate a relative rotation range of said driving member with respect to said driving shaft when said operating handle is put in the first position, and can release regulation when said operating handle is put in the second position, and e) free rotation holding means having resistance means which has free rotation control surfaces which, when said operating handle is put in the second position to release the regulation and rotates for free rotation operation, applies to said driving member a biasing force by said elastic biasing member and has a free rotation control surface for holding free rotation operation by said operating handle, said free rotation control surface applying resistance against movement of said operating handle in a return direction with respect to said free rotation operation.

2. A free rotation control apparatus in a hoist and traction machine according to claim 1, wherein said driving member is provided with a first driving member having a boss threadedly engageable with said driving shaft and a larger diameter portion opposite to said braking plate of said mechanical brake, a second driving member supported to be rotatable relative to said boss of said first driving member, an elastic member for biasing friction plates and said second driving member toward said larger diameter portion of said first driving member, and an adjusting member which changes a biasing force by said elastic member to said friction plates so as to adjust a slip load, said adjusting member being opposite to said operating handle and being provided with free rotation control surfaces and regulating portions for regulating a relative-rotation range of said driving member with respect to said driving shaft in the first position of said operating handle, said free rotation control surfaces being provided with resistance means for applying resistance against movement of said operating handle in the return direction with respect to said free rotation operation.

3. A free rotation control apparatus in a hoist and traction machine according to claim 1, wherein said free rotation holding means comprises said free rotation control surfaces provided at said driving member and projections each adjacent to said free rotation control surface to apply to said driving member a biasing force by said elastically biasing member, said projections being provided at said operating handle.

4. A free rotation control apparatus in a hoist and traction apparatus according to claim 3, wherein said free rotation control surfaces each comprise a gradient surface in elastic contact with said projection so as to apply resistance against rotation of said operating handle in the return direction thereof, said gradient surface comprising said resistance means.

5. A free rotation control apparatus in a hoist and traction machine according to claim 3, wherein said free rotation control surfaces comprise rough surfaces having a large number of ruggednesses for applying resistance against return rotations of said projections, said rough surfaces constituting said resistance means.

6. A free rotation control apparatus in a hoist and traction machine according to claim 3, wherein said free rotation control surfaces are each provided with a free rotation holding portion for holding free rotation operation by elastic contact with said projections when said operating handle is free-rotation-operated, and at the front in the return rotation direction of said protection when said operating handle rotates in the return direction with respect to said free rotation holding portion is provided a recess for applying resistance against the return rotation of said protection.

* * * * *